United States Patent
Sogawa

(10) Patent No.: US 6,366,691 B1
(45) Date of Patent: Apr. 2, 2002

(54) STEREOSCOPIC IMAGE PROCESSING APPARATUS AND METHOD

(75) Inventor: Yoshiyuki Sogawa, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/667,005

(22) Filed: Sep. 21, 2000

(30) Foreign Application Priority Data

Sep. 22, 1999 (JP) .......................................... 11-269396

(51) Int. Cl.[7] ................................................ G06K 9/00
(52) U.S. Cl. ...................................... 382/154; 348/116
(58) Field of Search ................................ 382/151, 153, 382/154; 348/116, 118, 119, 122, 129, 113, 143; 345/419, 420, 421, 427

(56) References Cited

U.S. PATENT DOCUMENTS 5,410,346 A * 4/1995 Saneyoshi et al. .......... 348/118
5,581,638 A * 12/1996 Givens et al. .............. 382/294
5,808,591 A * 9/1998 Mantani ...................... 345/82

FOREIGN PATENT DOCUMENTS

| JP | 5-114099 | 5/1993 |
| JP | 5-265547 | 10/1993 |

* cited by examiner

Primary Examiner—Andrew W. Johns
Assistant Examiner—Seyed Azarian
(74) Attorney, Agent, or Firm—Smith, Gambrell & Russell, LLP

(57) ABSTRACT

A stereoscopic image processing apparatus comprises a stereo processing circuit 6 and a pairing filter 13. The stereo processing circuit 6 identifies a correlated destination of each pixel block in a reference image in a comparative image by searching along the same horizontal line as the pixel block. The stereo processing circuit 6 also calculates the parallax of the pixel block based on a deviation between the position of the pixel block and the position of the correlated destination. The pairing filter 13 judges the smallest parallax in the parallaxes of the plural pixel blocks as a valid parallax when plural pixel blocks located on the same horizontal line in the reference image have the same correlated destination.

7 Claims, 4 Drawing Sheets

STEREOSCOPIC IMAGE PROCESSING APPARATUS AND METHOD

BACKGROUND OF THE INVENTION

1. Field of the Invention

The present invention relates to an apparatus and a method for stereoscopic image processing. More particularly, it is concerned with a process of filtering parallaxes calculated from stereoscopic images.

2. Description of the Related Art

Considerable attention is given in recent years to a vehicle monitoring apparatus which obtains information (preview information) on views ahead of own vehicle using a stereo camera apparatus and controls the vehicle based on this information. As an example, a stereo type vehicle monitoring apparatus calculates a positional deviation (parallax) of a common object on a pair of photographed images (stereo matching) The apparatus determines the distance to the object based on the calculated parallax using the principle of triangulation. Then, using also image recognition technology, the apparatus recognizes the distance to a running vehicle or other objects ahead of own vehicle or road shapes.

Various three-dimensional objects exist outside own vehicle, and in many cases a plurality of similar objects could be shown on the photographed image. A row of traffic cones, road lamps and electric poles are typical examples of similar-looking three-dimensional objects. Stereo matching performed based on stereoscopic images in which a plurality of look-alike three-dimensional objects are shown tends to mismatch, and therefore there is a possibility that wrong parallaxes may be calculated.

SUMMARY OF THE INVENTION

This invention has been made in consideration of the aforementioned circumstances. Accordingly, an object of the present invention is to provide an apparatus and a method for stereoscopic image processing which remove wrong parallaxes by filtering operation if the wrong parallaxes have been calculated due to a mismatch in the stereo matching under such conditions that a plurality of look-alike three-dimensional objects are present.

Another object of the present invention is to prevent deterioration of reliability of distance information by removing erroneously calculated parallaxes.

The objects can be achieved by a stereoscopic image processing apparatus comprising: a first image producing unit; a second image producing unit; a stereo matching unit; and a filter. The first image producing unit produces a first photographed image of an object scene. The second image producing unit produces a second photographed image of the object scene. The stereo matching unit identifies within the second photographed image a correlated destination of each pixel block in first photographed image by searching along the same horizontal line as the pixel block of the first photographed image and calculates a parallax of the pixel block based on a deviation between a position of the pixel block of the first photographed image and a position of the correlated destination. The filter judges the smallest parallax in the parallaxes of the plural pixel blocks as a valid parallax when plural pixel blocks located on the same horizontal line in the first photographed image have the same correlated destination in the second photographed image.

In the stereoscopic image processing apparatus of the invention, it is preferable that the filter judges the parallax, which has not been judged as the valid parallax, as valid parallax, if it has a value smaller than a predetermined value.

The above-mentioned objects can be achieved by a stereoscopic image processing method comprising:

producing a first photographed image of an object scene;

producing a second photographed image of the object scene;

identifying within the second photographed image a correlated destination of each pixel block in first photographed image by searching along the same horizontal line as the pixel block of the first photographed image;

calculating a parallax of the pixel block based on a deviation between a position of the pixel block of the first photographed image and a position of the correlated destination; and judging, when plural pixel blocks located on the same horizontal line in first photographed image have the same correlated destination in the second photographed image, the smallest parallax in the parallaxes of the plural pixel blocks as a valid parallax.

In the stereoscopic image processing method of the invention, it is preferable that the step of judging the parallax having the smallest value judges the parallax, which has not been judged as the valid parallax, as a valid parallax if it has a value smaller than a predetermined value.

The stereoscopic image processing method of the invention preferably further comprises: counting the number of parallaxes which have not been judged as the valid parallax.

Further, the above-mentioned objects can be achieved by a stereoscopic image processing apparatus comprising: a first image producing unit; a second image producing unit; a stereo matching unit; and a filter. The first image producing unit produces a first photographed image of an object scene. The second image producing unit produces a second photographed image of the object scene. The stereo matching unit identifies within the second photographed image a correlated destination of each pixel block in first photographed image by searching along the same horizontal line as the pixel block of the first photographed image and calculates a parallax of the pixel block based on a deviation between a position of the pixel block of the first photographed image and a position of the correlated destination. The filter judges parallaxes each of which has a value smaller than a predetermined value as valid parallaxes, when plural pixel blocks located on the same horizontal line in the first photographed image have the same correlated destination in the second photographed image.

In the stereoscopic image processing apparatus of the invention, it is preferable that the filter judges the smallest parallax in the parallaxes, which have been judged as the valid parallaxes, as a valid parallax.

DETAILED DESCRIPTION OF THE PREFERRED EMBODIMENT

Figure 1:
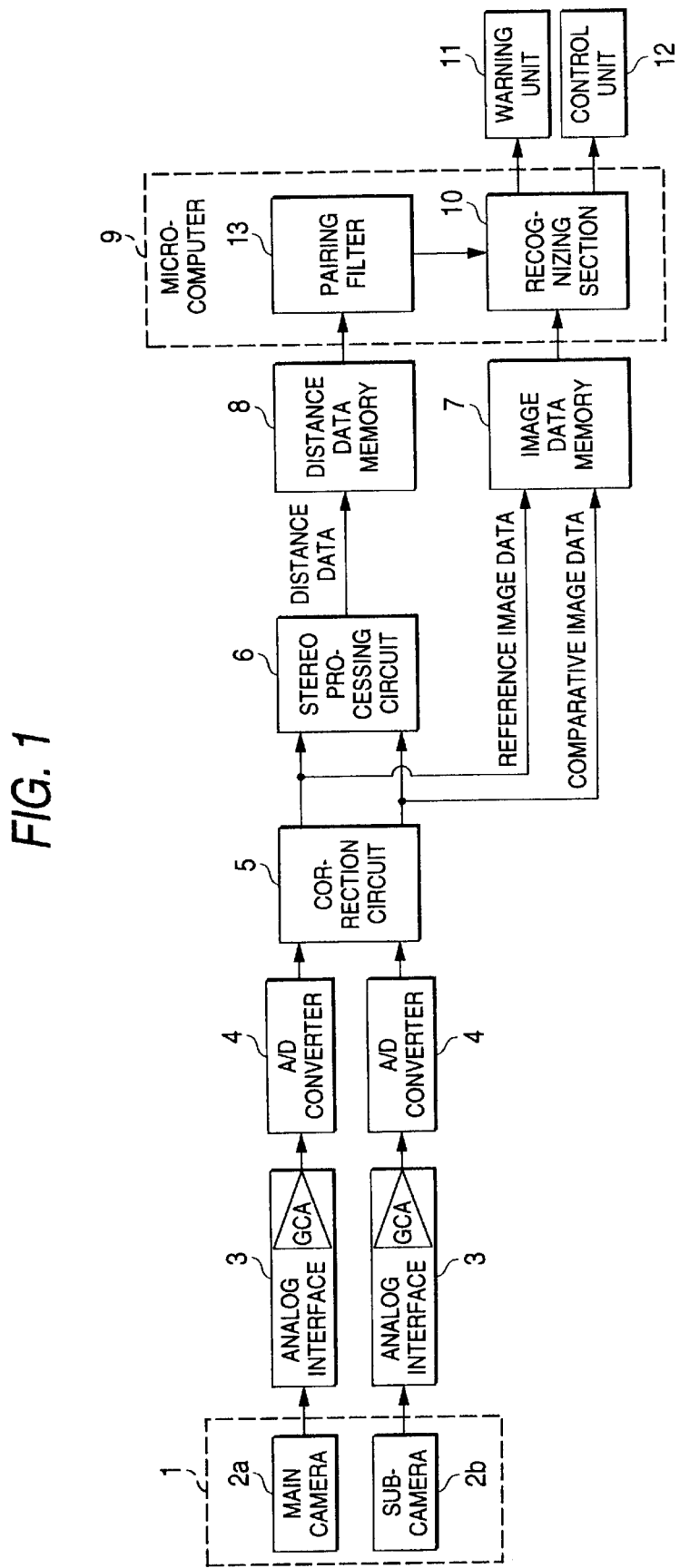
FIG. 1 is a block diagram of a stereo type vehicle monitoring apparatus.

FIG. 1 is a block diagram of a stereo type vehicle monitoring apparatus. A stereo camera apparatus 1 takes pictures of views outside of a vehicle. The stereo camera apparatus 1 is mounted in the vicinity of its rear-view mirror and formed of a pair of cameras 2a, 2b, each incorporating an image sensor such as a charge-coupled device (CCD). These cameras 2a, 2b are attached with a predetermined spacing in a direction of vehicle width therebetween. The main camera 2a for obtaining a reference image is attached on the right side of a vehicle's forward direction. On the other hand, the sub-camera 2b for obtaining a comparative image is attached on the left side of the forward direction. Under conditions where the pair of the cameras 2a, 2b is synchronized, analog images output from the individual cameras 2a, 2b are adjusted in analog interfaces 3 such that the analog images match input ranges of succeeding stages. Gain control amplifiers (GCA's) in the individual analog interfaces 3 adjust brightness balance of a pair of analog image signals.

The pair of the analog images adjusted in the analog interfaces 3 is converted into digital images of a predetermined brightness level(e.g., 256 gray scale levels) by analog-to-digital (A/D) converters 4. The digitized image pair (stereoscopic images) is subjected to a brightness correction and a geometric transformation, for instance, which are performed by a correction circuit 5. Since there are usually more or less some errors in mounting positions of the stereo cameras 2a, 2b, there exists a displacement of the left and right images caused by those errors. Thus, the geometric transformation, such as rotation or parallel displacement of the images, is performed using an affine transformation, for example. Such treatment ensures a precondition for performing stereo matching that horizontal lines of the pair of images should coincide with each other. After the aforementioned image processing operation, reference image data of 512 pixels in the horizontal direction by 200 pixels in the vertical direction is produced from an output signal of the main camera 2a. Also, from an output signal of the sub-camera 2b, comparative image data having the same vertical length as the reference image data and a greater horizontal length than the reference image data (640 pixels in the horizontal direction by 200 pixels in the vertical direction, for example) is obtained. The reference image data and the comparative image data are stored in an image data memory 7.

A stereo processing circuit 6 calculates parallaxes based on the reference image data and the comparative image data. Since the parallax is calculated for each individual pixel block of 4×4 pixels, a maximum of 128×50 parallaxes can be obtained from one complete frame of the reference image. Considering one pixel block in the reference image, a region having a correlation with brightness property of the pixel block in the reference image is identified by searching within the comparative image (stereo matching).

As is commonly known, the distance to a photographed object is obtained as a parallax in the stereoscopic images, that is, as the amount of deviation in a horizontal direction between the reference image and the comparative image. Therefore, when searching for the comparative image, search is to be made on the same horizontal line (epipolar line) as the horizontal position (j-coordinate) of the relevant pixel block in the reference image. While shifting a search point pixel by pixel along the epipolar line, the stereo processing circuit 6 evaluates the correlation between the individual pixel blocks in the comparative image and the relevant pixel block in the reference image. The correlation between the pixel blocks can be evaluated by calculating city block distances, for example. Basically, a pixel block where the value of the city block distance is a minimum is the pixel block having a correlation. Parallaxes between the pixel blocks are output as parallaxes. Reference should be made to Japanese Unexamined Patent Publication No. 5-114099 for details of hardware configuration for calculating the city block distance, if necessary, since they are disclosed therein.

The parallaxes for one frame calculated by the aforementioned method are stored in a distance data memory 8.

A microcomputer 9 (or a recognizing section 10 which s a functional block of the microcomputer 9 when viewed from a functional point of view) recognizes road shapes (white lines) and each three-dimensional object (running vehicle) ahead of own vehicle, for example. This recognition is made based on the image data stored in the image data memory 7 and the parallaxes stored in the distance data memory 8. Sensor information fed from a vehicle speed sensor and a steering angle sensor, which are not illustrated, as well as navigation information is also referred to as necessary. Reference should be made to Japanese Unexamined Patent Publication No. 5-265547 for specific methods of recognition of road shapes and three-dimensional objects, if necessary, since they are disclosed therein. If it is judged to be necessary to give a warning based on the results of such recognition, the microcomputer 9 activates a warning unit 11, such as a monitor or a speaker, to thereby draw a driver's attention. Also, the microcomputer 9 performs such vehicle control operation as a downshift of an AT (automatic transmission), a reduction in engine output, or activation of brakes by controlling a control unit 12 as the need arises.

Figure 2:
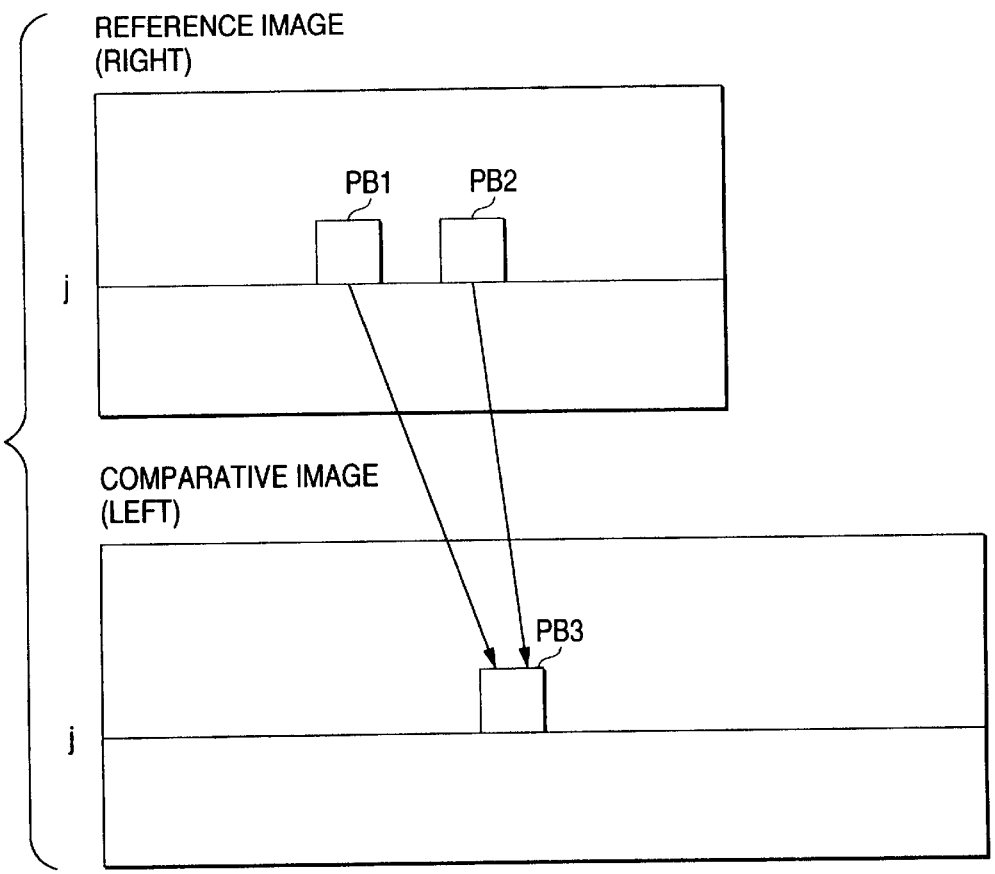
FIG. 2 is a diagram for explaining the principle of a pairing filter.

A pairing filter 13 detects a discordance in positional relationship between pixel blocks which have been judged by the stereo processing circuit 6 to have a correlation, and removes the parallax calculated for such pixel blocks having the discordance. Specifically, when multiple pixel blocks PB1, PB2 on the same horizontal line in the reference image have a common correlated destination (pixel block PB3) as shown in FIG. 2, the parallax of only one pixel block is judged to be a valid parallax, and this valid parallax is transferred to the recognizing section 10. The rest is judged to be an invalid parallax (the parallax is set to be 0). According to the principle of the stereo method, plural pixel blocks located on the same horizontal line in the reference image would not have a common correlated destination. Under conditions where a plurality of look-alike objects such as a row of traffic cones, road lamps and electric poles are photographed, however, the plural pixel blocks PB1, PB2 may be accidentally matched with the same pixel block PB3. This will result calculation of a wrong parallax.

Under this circumstance, when correlated destinations of the plural pixel blocks PB1, PB2 coincide with each other, the pairing filter 13 selects only the smallest parallax (parallax of the pixel block PB2) as the valid one and regards the other parallax (parallax of the pixel block PB1) as being invalid. This means that priority is given to distance information on a distant object rather than to distance information on a nearby object.

A reason why the priority is given to a smaller parallax (that is, information on a distant object) is that an object existing at a long distance appears small in a photographed image and, as a consequence, the number of parallaxes calculated for the distant object is small. In other words, since an object existing at a short distance appears relatively large, there is a tendency that a relatively large number of parallaxes are calculated for that nearby object. Therefore, even if some parallaxes are invalidated by filtering operation, the number of distance data of the nearby object rarely becomes insufficient. On the contrary, since the object at the long distance appears small when photographed, the number of parallaxes calculated for this distant object is not so large. Therefore, if parallaxes of the object at the long distance are made invalid, it is likely that the amount of information on the distant object becomes insufficient. Consequently, the importance of the individual parallaxes inevitably becomes greater for distant objects than for nearby objects. For the aforementioned reasons, smaller parallaxes are judged to be valid and the remaining parallaxes whose importance is considered to be less significant are judged to be invalid.

By using the above-described pairing filter 13, it is possible to properly remove parallaxes erroneously calculated due to a mismatch in the stereo matching even under such conditions that a plurality of look-alike objects are present. In other words, as a result of performing the filtering operation, it is possible to make corrections in such a way that plural pixel blocks in the reference image would not be related to the same region in the comparative image (to avoid a plural-to-one correlation). Accordingly, the accuracy of parallaxes which have been judged to be valid in the filtering operation by the pairing filter 13 is higher than the accuracy of parallaxes calculated by the stereo processing circuit 6.

In addition, by giving priority to information on distant objects whose number of calculated parallaxes is relatively small, it is possible to prevent causing a lack of important distance information. Monitoring the outside of the vehicle based on valid parallaxes obtained through the filtering operation so far described provides such advantageous effect that it is possible to achieve an improvement in the accuracy of monitoring.

From this point of view, if there exist a plurality of parallaxes (information on an object at a relatively long distance) that are equal to or smaller than a specific value, it is preferable to judge these parallaxes to be valid.

Figure 3:
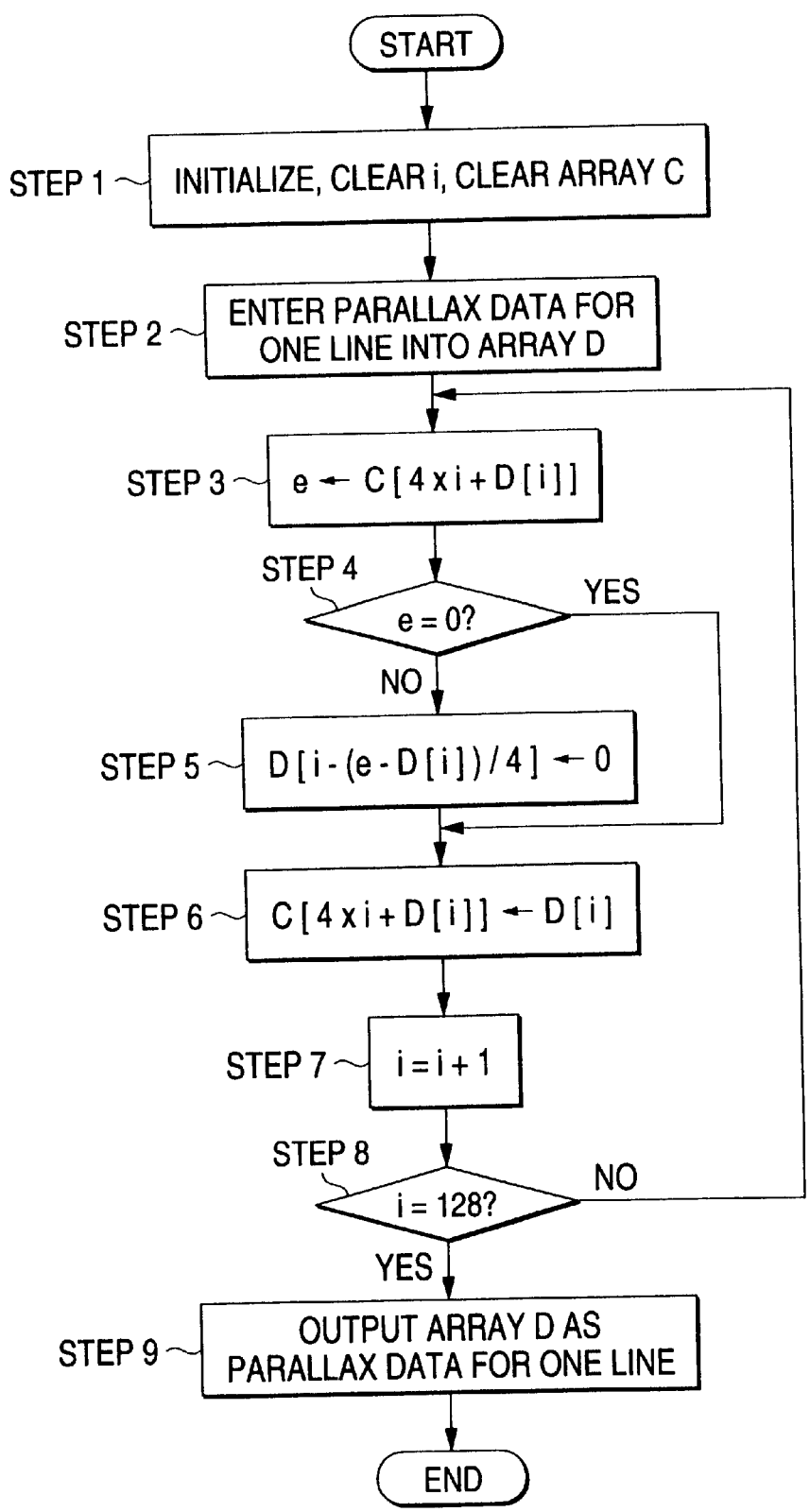
FIG. 3 is a flowchart showing a procedure of filtering operation.
Figures 4A, 4B, 4C:
FIGS. 4A–C are respectively diagrams for explaining corrections to parallaxes for one line.

FIG. 3 is a flow chart showing a procedure of the filtering operation. Also, FIGS. 4A–C are diagrams for explaining corrections to be made to parallaxes for one line. First, initialization is carried out in step 1. Specifically, a counter i is reset to 0 and an array C is cleared. The array C is a work area for evaluating correlations of parallaxes calculated for one horizontal line of pixel blocks in the reference image and is formed of the same number of array elements C[0] to C[639] as the number of pixels horizontally arranged in the comparative image.

Next, in step 2, parallax data for one horizontal line are taken into an array D. The array D is formed of the same number of array elements D[0] to D[127] as the number of pixel blocks horizontally arranged in the reference image. As shown in FIG. 4A, the parallax of array element D[0] is 8. The individual array elements D[i] ($0 \leq i \leq 127$) correspond to the pixel blocks and the number of pixels horizontally arranged in each pixel block is 4. Therefore, the correlated destination of array element D[0] is array element C[8] (0×4+8) On the other hand, since the parallax of array element D[1] is 4, the correlated destination of array element D[1] is also array element C[8] (same correlated destination) like array element D[0]. Accordingly, the parallax 8 of array element D[0] is invalidated by a sequence of steps 3 to 9 described below.

In step 3, variable e is set to the value of array element C[4×i+D[i]]. Since the initial value of i is 0 and array element D[0] is 8, e is set to 0.

Then, in step 4, a judgment is made as to whether the variable e is equal to 0 or not. Since e is equal to 0, the operation flow proceeds to step 6, in which the value of array element D[i] is set in array element C[4×i+D[i]]. Here, the value of array element D[0], or 8, is set in array element C[8] as shown in FIG. 4B. The fact that a value is set in an array element C[j] ($0 \leq j \leq 639$) means that there exists an array element D[i] whose correlated destination is the array element C[j].

In step 6 which follows step 7, after the counter i has been incremented (that is, i has become equal to 1), a judgment is made as to whether the value of the counter i is equal to 128, or as to whether evaluation of one horizontal line of the reference image has been finished. Since i is equal to 1, the operation flow returns to step 3.

In step 3, the value of array element C[4×1+D[1]], or 8, is read out and the variable e is set to 8. The fact that the variable e is set to a value other than 0 means that another array element having the same correlated destination already existed prior to the array element D[i] (D[1] when i=1) which is currently subjected to evaluation. Thus, in this case, the operation flow proceeds to step 5 after a negative judgment in step 4, and the value of an array element having a larger parallax is set to 0. Specifically, the value of array element D[i−(e−D[i])/4] is set to 0. Here, since i=1, the value of array element D[1−(8−4)/4]], or D[0], is set to 0 (see FIG. 4C). As a result, the larger parallax 8 is removed. Then, in step 6, the array element D[1] is set to the array element C[4×1+D[1]], or C[8].

When the value of the counter i has become equal to 128 by repeatedly executing the aforementioned steps, or when the evaluation of parallaxes for one horizontal line has been completed, the operation flow proceeds to step 9. Then, the corrected array D is output as parallax data for one line and the operation is finished.

The filtering operation shown in the flowchart of FIG. 3 is performed on all horizontal lines (50 lines) in one complete frame in the above-described manner.

If the number of parallaxes removed by the pairing filter 13 (the number of parallaxes which have been judged to be invalid)is large, it means that there is a problem in the reliability of the parallaxes calculated by the stereo processing circuit 6. Thus, the number of invalidated parallaxes in the pairing filter 13 is counted to obtain the number of invalidated parallaxes for one line (or for one frame). If this number is used as a reliability factor, it is possible to perform more proper vehicle monitoring control operation. It would also be possible to take a method to weight the parallax data in the recognizing section 10 based on the reliability factor.

Furthermore, in the flowchart of FIG. 3, the array C which is the work area for evaluating the parallaxes needs to include 640 array element C[j]. If, however, steps 3, 5 and 6 are modified as shown below, it is possible to reduce the size of the work area to ¼. The array C of this case is formed of i number of array element C[i] ($0 \leq i \leq 160$).

Step 3
  e←C[i−(D[i]+2)/4]
Step 5
  D[i−(e−(D[i]+2)/4)×4]←0
Step 6
  C[i+(D[i]+2)/4]←(D[i]+2)/4

When incorrect parallaxes have been calculated due to a mismatch in stereo matching under conditions where a plurality of similar-looking three-dimensional objects exist, it is possible to remove such parallaxes by filtering operation as seen above in the present invention. Then, it is possible to prevent deterioration of reliability of distance information (parallaxes) by removing the erroneously calculated parallaxes.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A stereoscopic image processing apparatus comprising:

a first image producing unit which produces a first photographed image of an object scene;

a second image producing unit which produces a second photographed image of said object scene;

a stereo matching unit which identifies within the second photographed image a correlated destination of each pixel block in first photographed image by searching along the same horizontal line as said pixel block of the first photographed image and calculates a parallax of said pixel block based on a deviation between a position of said pixel block of the first photographed image and a position of said correlated destination; and a filter which, when plural pixel blocks located on the same horizontal line in said first photographed image have the same correlated destination in said second photographed image, judges the smallest parallax in the parallaxes of said plural pixel blocks as a valid parallax.

2. The stereoscopic image processing apparatus as recited in claim 1, wherein said filter judges the parallax, which has not been judged as the valid parallax, as valid parallax, if it has a value smaller than a predetermined value.

3. A stereoscopic image processing method comprising:

producing a first photographed image of an object scene;

producing a second photographed image of said object scene;

identifying within the second photographed image a correlated destination of each pixel block in first photographed image by searching along the same horizontal line as said pixel block of the first photographed image;

calculating a parallax of said pixel block based on a deviation between a position of said pixel block of the first photographed image and a position of said correlated destination; and judging, when plural pixel blocks located on the same horizontal line in first photographed image have the same correlated destination in said second photographed image, the smallest parallax in the parallaxes of said plural pixel blocks as a valid parallax.

4. The stereoscopic image processing method as recited in claim 3, wherein said step of judging the parallax having the smallest value judges the parallax, which has not been judged as the valid parallax, as a valid parallax if it has a value smaller than a predetermined value.

5. The stereoscopic image processing method as recited in claim 3, further comprising:

counting the number of parallaxes which have not been judged as the valid parallax.

6. A stereoscopic image processing apparatus comprising:

a first image producing unit which produces a first photographed image of an object scene;

a second image producing unit which produces a second photographed image of said object scene;

a stereo matching unit which identifies within the second photographed image a correlated destination of each pixel block in first photographed image by searching along the same horizontal line as said pixel block of the first photographed image and calculates a parallax of said pixel block based on a deviation between a position of said pixel block of the first photographed image and a position of said correlated destination; and a filter which, when plural pixel blocks located on the same horizontal line in said first photographed image have the same correlated destination in said second photographed image, judges parallaxes each of which has a value smaller than a predetermined value as valid parallaxes.

7. The stereoscopic image processing apparatus as recited in claim 6, wherein said filter judges the smallest parallax in the parallaxes, which have been judged as the valid parallaxes, as a valid parallax.

* * * * *